United States Patent [19]
Propst et al.

[11] 3,788,276
[45] Jan. 29, 1974

[54] ANIMAL MARKING APPARATUS AND METHOD

[75] Inventors: Robert L. Propst; Howard B. Propst, both of Ann Arbor, Mich.

[73] Assignee: Herman Miller, Research Corporation, Ann Arbor, Mich.

[22] Filed: Aug. 10, 1972

[21] Appl. No.: 279,631

Related U.S. Application Data

[60] Division of Ser. Nos. 159,784, July 6, 1971, which is a continuation-in-part of Ser. No. 12,056, Feb. 17, 1970, abandoned.

[52] U.S. Cl. ................................. 119/1, 119/51 R
[51] Int. Cl. ................................................. A01k 5/00
[58] Field of Search ........... 119/1, 3, 20, 51 R, 106; 128/2 R; 340/225, 228, 258, 172.5

[56] References Cited
UNITED STATES PATENTS

| | | | |
|---|---|---|---|
| 3,128,744 | 4/1964 | Jefferts et al. | 119/3 |
| 3,566,365 | 2/1971 | Rawson et al. | 128/2 R X |
| 3,557,758 | 1/1971 | Lack | 119/51 R |
| 3,260,034 | 7/1966 | Major | 119/106 X |
| 703,586 | 7/1902 | Hurst | 119/20 |

*Primary Examiner*—Louis G. Mancene
*Assistant Examiner*—J. A. Oliff
*Attorney, Agent, or Firm*—Price, Heneveld, Huizenga & Cooper

[57] ABSTRACT

A record keeping and tagging system made possible by a machine readable tag implanted in an animal by a tagging gun. The tag comprises a portion which is both visually readable and machine readable, and a portion which includes barbs or spring-biased tines which lock it to the animal. The tagging gun comprises cocking means for moving the tag-like article into a firing position, releasing means for releasing the article from the cocking means, means for firing the article, and triggering means for activating the cocking means and releasing means in sequence by applying a force in a single direction. An information retrieval station features a chute with compressible sides and a weighing and measuring platform, and a machine reader which is automatically positioned with respect to the tag when the animal triggers a photoelectric sensing device, so as to read out the information coded therein while the animal is weighed and/or measured. A computer can be utilized to compare the animal's weight and measurement determined so as to further direct the processing of the animal.

16 Claims, 28 Drawing Figures

PATENTED JAN 29 1974
3,788,276
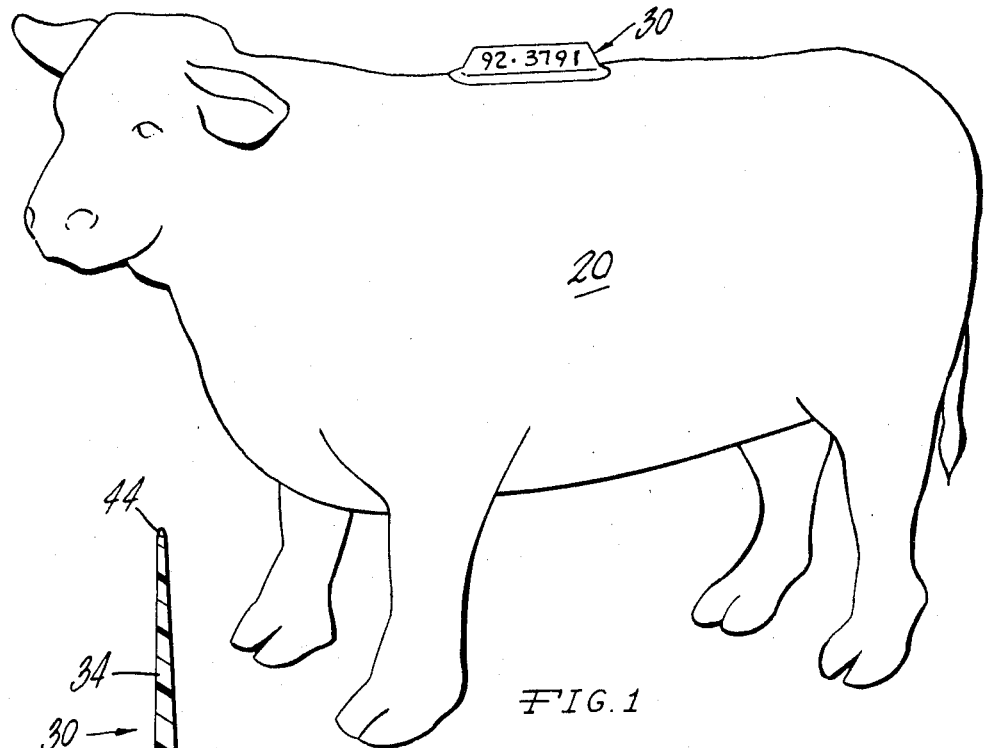
FIG. 1
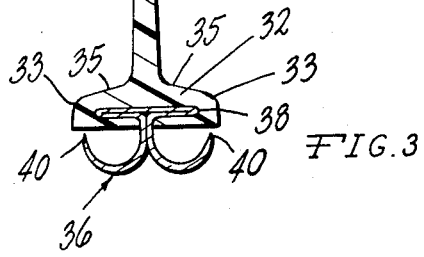
FIG. 3
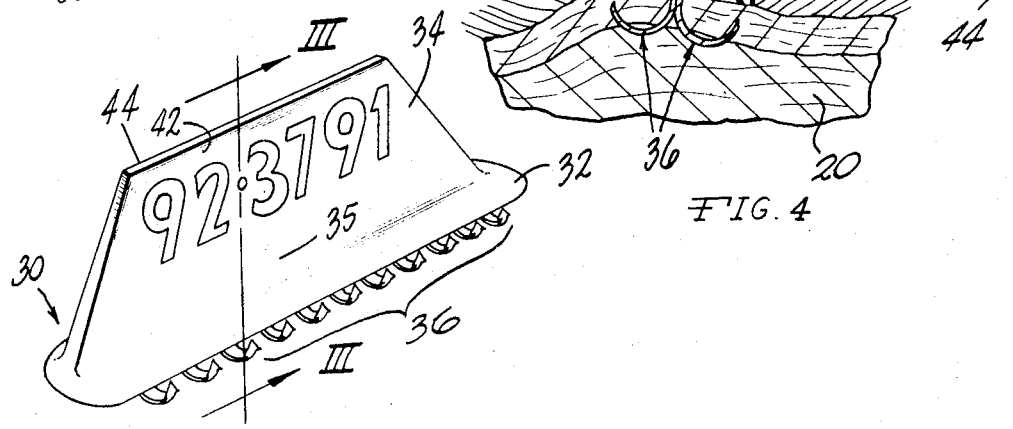
FIG. 4
FIG. 2

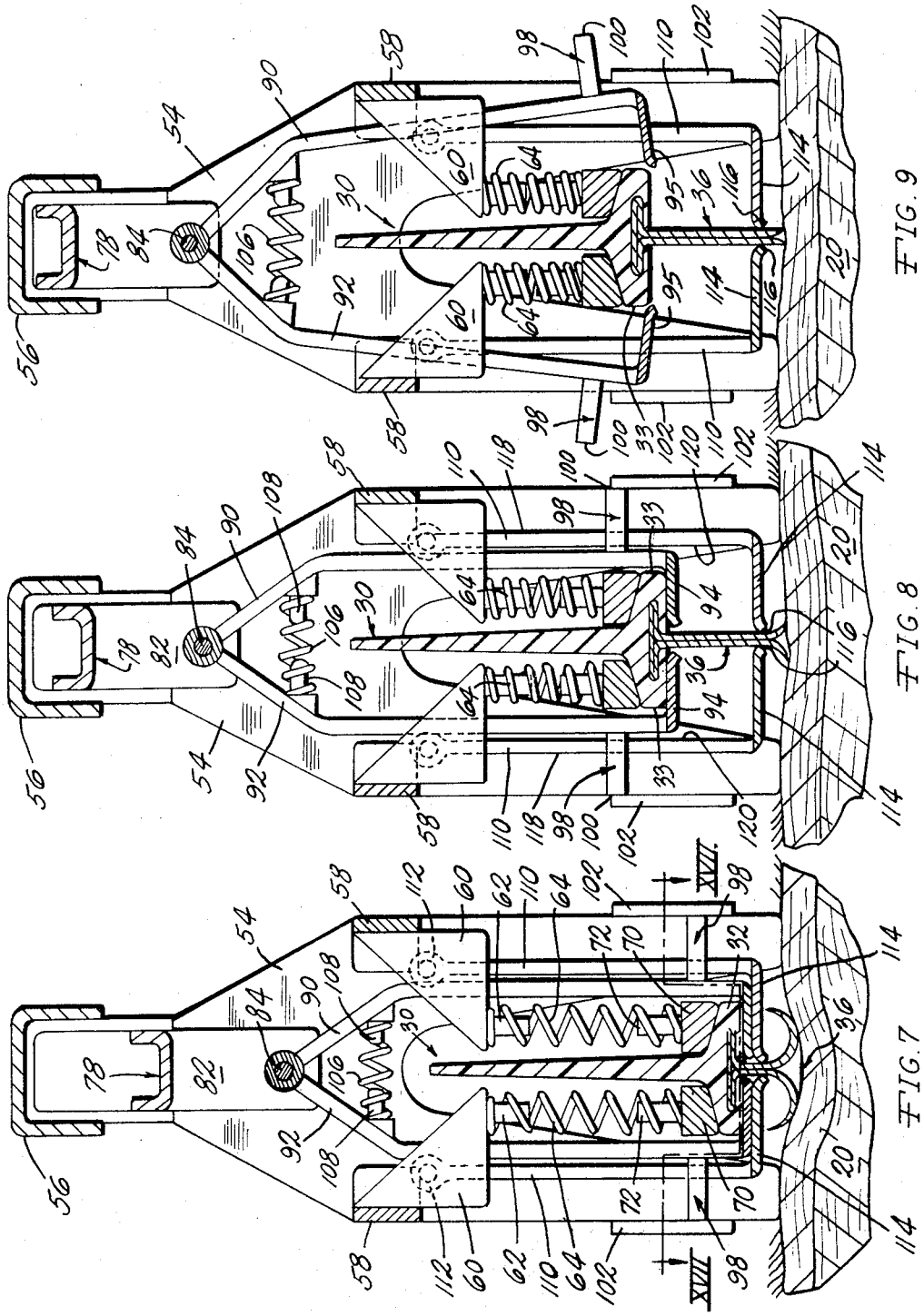

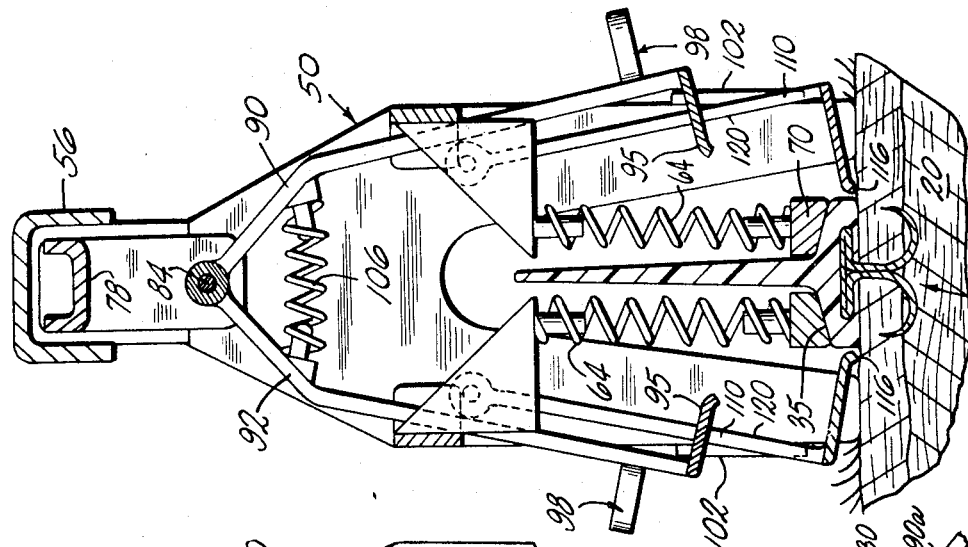

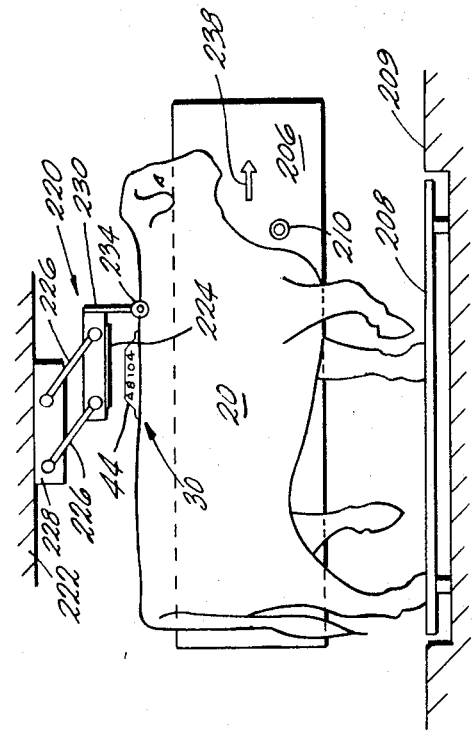
FIG. 12
FIG. 13
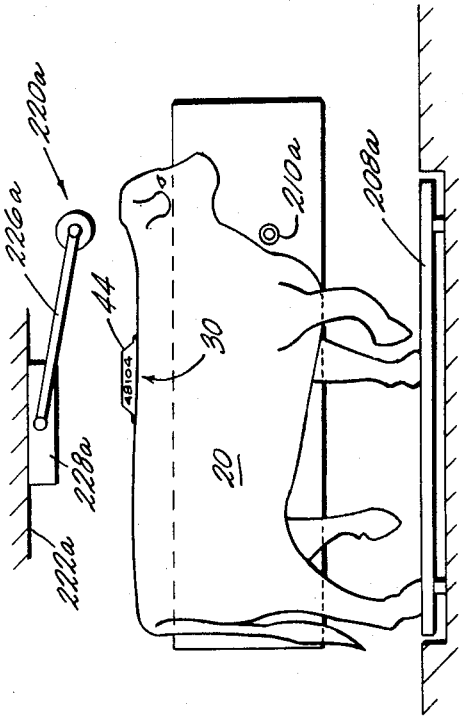
FIG. 14
FIG. 15

//ANIMAL MARKING APPARATUS AND METHOD

CROSS REFERENCE TO RELATED APPLICATION

This is a divisional application of patent application Ser. No. 159,784, filed July 6, 1971, and entitled ANIMAL MARKING APPARATUS AND METHOD, which in turn is a continuation-in-part of parent application Ser. No. 12,056 filed Feb. 17, 1970, and now abandoned.

BACKGROUND OF THE INVENTION

In the production of animals for meat, wool, pelts and the like or for laboratory use, it is very desirable to be able to identify each animal individually and to periodically record individual animal information such as weight performance, progeny performance, carcass characteristics, physical condition, etc. A system for the recording and management of individual animal information would be a valuable tool in breeding, feeding, testing and other aspects of animal production as well as in disease eradication, laboratory experimentation, wild-life management and other programs.

The field is confronted with two serious problems. One is the lack of a tag or identifying device which will individually identify each animal and carry other essential information through an adequate coding system and which can be reliably read either visually or by machine. The other is the lack of a system which records essential information about each animal as the animal is processed and which produces the information in usable form as required. Thus, present methods are so limited as to seriously hamper the use of advanced concepts of breeding and management. Identifying tags have been applied to various portions of the anatomy but have serious limitations in actual use. Visual readability is difficult because of being obscured by location, hair growth, etc. Present tags are limited in the numbering or coding systems that can be accommodated and thus cannot provide all of the information that is essential. The loss of tags makes present systems difficult to maintain. In addition, present tags have no capability for being read automatically by machines, preventing development of automatic record keeping.

The thrust of the invention is to provide the essential elements required by a comprehensive animal identification and information system.

SUMMARY OF THE INVENTION

This invention relates to novel tag-like articles, novel apparatus for applying the tag-like articles, and a novel record keeping station and method which allows automatic identification of each item, such as individual livestock, bearing a tag. Specifically, tags have been developed which convey the identity and other record information in visual and/or machine readable form, such as by a magnetic strip, inductor and capacitor resonant circuits or infrared photoelectric, or other ray-sensing system, and tagging guns have been developed for affixing portions of the tags to the bodies of the animals, e.g., portions of the tags having anti-removal barbs or spring-biased tines.

The tagging gun comprises cocking means for moving the tag-like article into a firing position, releasing means for releasing the article from the cocking means, means for firing the article, and triggering means for activating the cocking means and releasing means in sequence by applying a force in a single direction.

A recording or information retrieval station is provided in which the machine readable tag is automatically machine read while the animal is simultaneously being weighed, measured or tested, the station including means for confining the animal to a prescribed area and direction of travel, means for sensing the presence of the animal, and means for locating the tags on the animals so as to position the reader with respect to the tag. The recording station and the tag of the invention thus allow the livestock to be processed by tagging individual members prior to feeding or breeding them, and thereafter ascertaining the progress or condition of the individual members by moving them through the afore-described recording station.

Accordingly, it is an object of this invention to provide a novel identification tag particularly adapted for use on animals, although having other uses elsewhere, such tag having vertical standing capability to enable visual reading from one or both sides.

It is another object of the invention to provide a tag for animals which conveys identity and other information in a machine readable form so as to allow machine identification of the individual animals during all stages of the production or testing process.

It is a related object of the invention to provide such a tag which may be firmly and permanently attached to the animal by means of a spring loaded attaching device and which will retain its basic configuration despite stresses the animal may place upon the tag so as to be readily available for visual or machine reading.

It is another object of the invention to provide an alternate means of attaching the tag to an animal by means of cementing the tag directly to the skin.

It is another object of the invention to provide a tagging gun for applying such a tag, which gun applies the tags in a quick and easy manner.

It is a further object of the invention to provide a recording station which automatically and conveniently reads the machine readable tag in conjunction with further processing or measurement of the animal.

Other objects and advantages will become apparent upon reference to the following drawings and detailed discussion.

BRIEF DESCRIPTION OF THE DRAWINGS

FIG. 1 is a perspective view of a tag constructed in accordance with the invention, mounted on the back of a livestock animal;

FIG. 2 is an enlarged perspective view of the tag tag only of FIG. 1;

FIG. 3 is a sectional view taken generally along the plane III—III of FIG. 2;

FIG. 4 is a fragmentary sectional view illustrating the flexible feature of the tag of FIG. 1 when mounted;

FIG. 7 is an end view in section illustrating the tagging gun of FIG. 6 prior to the cocking thereof;

FIGS. 8 through 10 are end views in section illustrating successive stages in the cocking and firing of the tagging gun of FIG. 6;

FIG. 11 illustrates an alternate embodiment of a portion of the structure of the tagging gun of FIG. 6;

FIG. 12 is a fragmentary side elevational view illustrating a typical recording or reading station;

FIG. 13 is an end elevational view of the station shown in FIG. 12;

FIG. 14 is a fragmentary side elevational view of an alternate embodiment of the recording or reading station;

FIG. 15 is a fragmentary end view of the station shown in FIG. 14 with a reading or recording head lowered into position;

FIG. 16 is a schematic perspective illustration of the automatic control and processing of the livestock through the use of a tag and the recording station of the invention;

DESCRIPTION OF THE PREFERRED EMBODIMENTS

Figure 5:
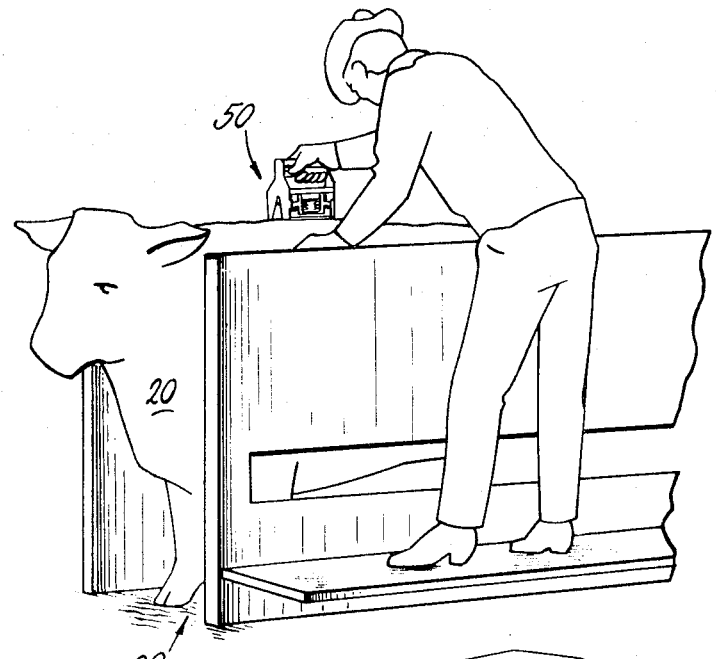
FIG. 5 is a fragmentary perspective view illustrating the process of applying a tag.

The invention concerns a system for labeling animals such as a steer 20 with a tag-like article 30. The tag 30 can be read visually from both sides and/or can convey coded information in machine readable form for individual record keeping purposes. A tagging gun 50 is provided for implanting into the animal at least a portion of the tag which portion is preferably other than the portion conveying the coded information. This is most conveniently done while the animal is moving through a chute 22 (FIG. 5). In conjunction with this system for labeling the animal, an information retrieval station 200 is provided which automatically records the coded information on the tag by a machine reading the same, while further processing the animal. The entire combination of the tag, the tagging gun, and the information retrieval station provides a process of storing and retrieving information concerning the production, testing and processing of each individual member animal utilizing the tagging system.

As used throughout the application, "machine readable form" means any form of which electrical, mechanical, and magnetic forms are only a few examples, which form is readable automatically by apparatus without the need for human translation. By "plurality of information indicia coded in machine readable form," it is meant machine readable coded information which provides more than just a sensing that a tag is present. Rather, such a plurality of coded information indicia is a plurality of "bits" of information representing, for example, the identity number. By "machine readable tag," it is meant any tag having the stored information readable in the above fashion.

The Tag

In accordance with one aspect of the invention, as shown in FIGS. 2 through 4, the tag 30 comprises a body having a base 32, edges 33 and a flexible panel 34 upstanding on the base. The top surface 35 of the base adjacent to the panel 34 is especially shaped to accommodate a gun driver, as hereinafter explained. On the side of the base 32 opposite to the panel 34, resilient flexible spring steel tines 36 project, the base 38 of the spring tines being embedded within the base 32. The spring tines are formed in two diverging rows projecting, due to their spring bias, outwardly from the base 32 in opposite directions. The bias of the tines 36 causes them to assume a semi-circular configuration when released, but the bias is not so strong as to prohibit the tines from being drawn flat as described hereinafter during the affixing process. The ends 40 of the tines are barbed to interlock with the skin, and the original bias of the tines causes them to reorient into their original diverging configuration after penetration, thereby preventing withdrawal of the tines from the skin of the animal after tagging, even if the tag is disturbed.

The panel 34, preferably, conveys the coded information in at least two different ways, visually and in machine readable form. The side 42 has printed thereon visually readable numbers representing, for example, the identification of the particular animal to which the tag is affixed. The numbers, preferably, are formed in letters large enough to be read at least 50 feet away. In addition, the tag can be automatically read by machine in several ways. The top edge of the panel 34 can be provided with a magnetic strip 44 molded thereinto, which strip is coded or is capable of being coded with either the same information conveyed in the printed form on the side 42 or different information depending upon the mode of use. The vertical panel 34 can also be utilized to imbed a punched membrane which allows selective penetration of waves or rays from a source on one side of the panel and transmission to a read-out device on the other side of the panel. The vertical panel 34 can also be utilized to imbed inductor and capacitor resonant circuits 44a which can be automatically read by a device 224. (see FIG. 16)

Finally, vertical panel 34 can be optically coded, e.g., on the top edge thereof, to be machine readable by an optical scanner, etc. For example, a binary code can be employed using a series of spaced lines on a background of contrasting color, e.g., black lines on a white background.

The base 32 and the panel 34 of the tag 30 are preferably formed such as by molding a flexible plastic material, so as to enhance the flexibility of the panel 34, thereby allowing the panel to bend and flex without breaking in the event the rib is forced against a solid object such as a limb L (FIG. 4). The tines 36 with their barbed ends 40 insure that the tag cannot be removed from the animal once inserted therein. Alternatively, the underside of the base 32 can be provided with a surgical-type cement to adhere the tag to the skin of the animal 20. By "surgical-type cement," it is meant any cement capable of permanently gluing skin together. By "underside" or "bottom" of the tag as used in this application, it is meant the side in contact with the animal when the tag is applied. Alternately, both surgical-type cement and the tines 40 could be used as a dual means of attaching the tag to an animal.

Figure 18:
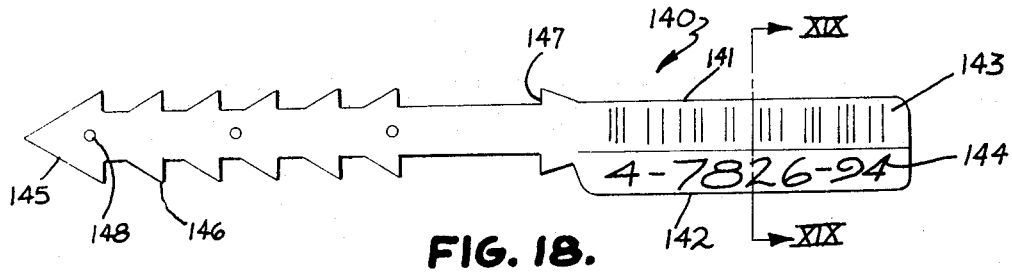
FIG. 18 is a plan view of another tag constructed in accordance with the invention.
Figure 20:
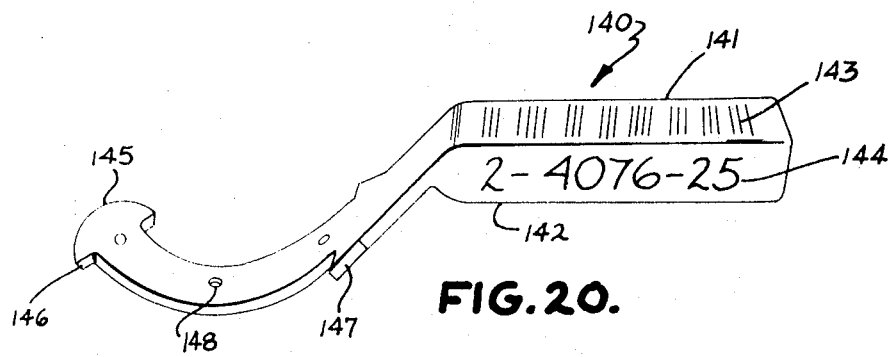
FIG. 20 is a perspective view of a variation of the tag of FIG. 18.
Figure 19:
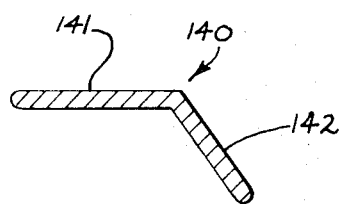
FIG. 19 is a cross-sectional view of the tag of of FIG. 18 taken along the line XIX — XIX of FIG. 18.

Another embodiment of the tag of the present invention is illustrated in FIGS. 18–20. Tag 140 includes an information bearing portion which comprises a top panel 14, and a side panel 142, each of which can be coded in visual or machine readable form as discussed above with respect to tag 30. As shown, top panel 141 is coded in machine readable form in a spaced line binary code 143 to be read by an optical scanner, and side panel is printed with visually readable numbers 144. Tag 140 also includes an animal attaching portion which is integral with the information bearing portion and which comprises an implanting stem 145 having one or more pairs of anti-removal barbs 146 thereon. The animal attaching portion and the information bearing portion should be located with respect to each other at two different levels as shown in FIG. 20 so that when tag 140 is implanted in an animal, the information bearing portion is not obscured by the hide, hair, etc. When the implanting stem is implanted under the skin of the animal, anti-removal barbs 146 prevent the tag from being withdrawn or misaligned if disturbed. Barbs 147 insure that the tag will not be implanted too deep during implanting or subsequent disturbance for proper visual or machine reading. The implanting stem can be impregnated with a germicidal agent to prevent infection. Apertures 148 are provided for attaching the tag to the implanting arm of the tagging gun as will be discussed hereinafter.

FIG. 19, which is a cross-sectional view of tag 140 taken along the line XIX—XIX of FIG. 18, more clearly shows the preferred orientation of top panel 141 and side panel 142.

Figure 26:
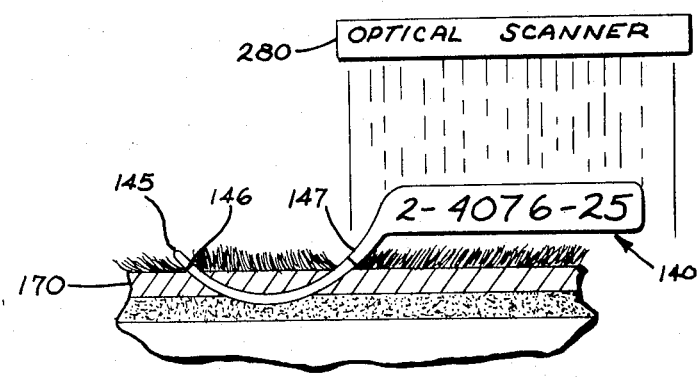
FIG. 26 is a side cross-sectional view of a tag of FIG. 20 implanted in the back of an animal in position for machine reading.

A variation of tag 140 is shown in FIG. 20, wherein implanting stem 145 has only one pair of anti-removal barbs 146 on the end thereof. This version of the tag is especially useful when the tag is implanted as shown in FIG. 26, with the end of the implanting stem protruding from the skin of the animal. Since in this case the end barbs 146 are adjacent the tough skin of the animal, there is less need for a plurality of pairs of barbs for firm implanting of the tag.

Figure 27:
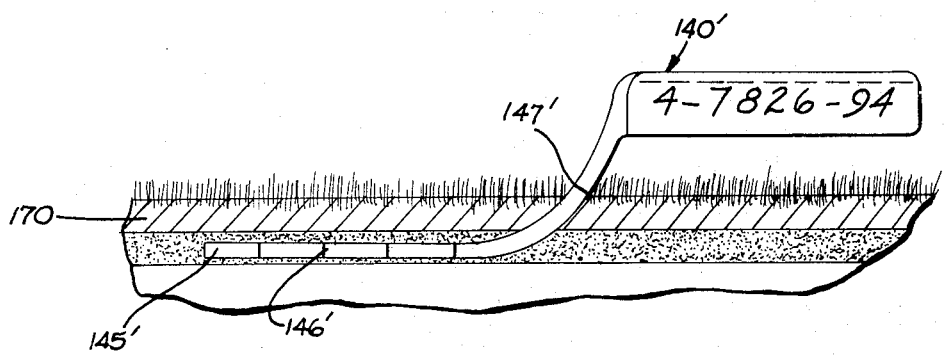
FIG. 27 is a side cross-sectional view of a tag of FIG. 18 implanted in the back of an animal.

Yet another variation of the tag is illustrated at 140' in FIG. 27 wherein the implanting stem 145' extends to its point in a plane generally parallel to surface 141 rather than curving back upwardly as in FIG. 26. In the utilization of this tag the entire leading extremity of the stem is buried beneath the hide of the animal, the barbs 146' preventing removal thereof.

Tag 140 is a preferred embodiment of the tag of the present invention from a cost and simplicity point of view. It can be inexpensively formed from a single integral piece of flexible material and can be easily and quickly implanted in an animal. The flexible material is preferably a plastic with good memory, such as Syrln, to prevent deformation if the tag is bumped, etc. Preferably Tag 140 is sickle-shaped as shown in FIG. 20, with the information bearing portion extending in a generally straight direction and the animal attaching portion curving out of the straight direction.

The Tagging Gun

Referring now to FIGS. 5 through 10 and 17, in accordance with another aspect of the invention, a tagging gun 50 is provided to implant the tines 36 of the tag 30 into the skin of the animal 20. The parts of the gun 50 are mounted in a frame having end plates 52 and 54 and a hand grip portion 56, support bars 58 extending between the end walls 52 and 54. The end plates 52 and 54 are each formed with an opening 59 therein. A pair of shoulders 60 are hung from the supporting bars 58 to support the firing mechanism of the gun. Two studs 62 (FIG. 7) depend from each shoulder 60, each stud having positioned thereover a compression spring 64, the other end of which terminates in a pair of plungers or drivers 70. Studs 72 guide the compression of the spring 64 with respect to the plungers 70.

Figure 6:
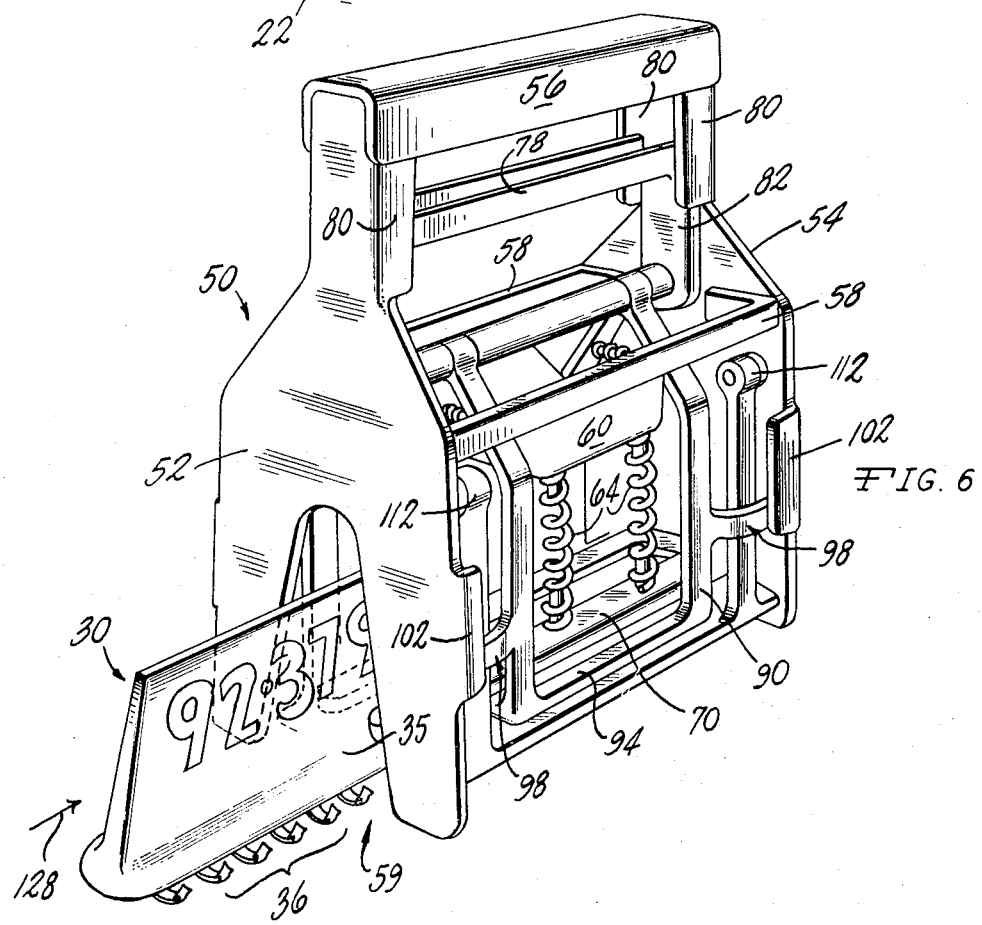
FIG. 6 is a perspective view of a tagging gun of the invention showing the loading thereof with a tag of FIG. 1.
Figure 17:
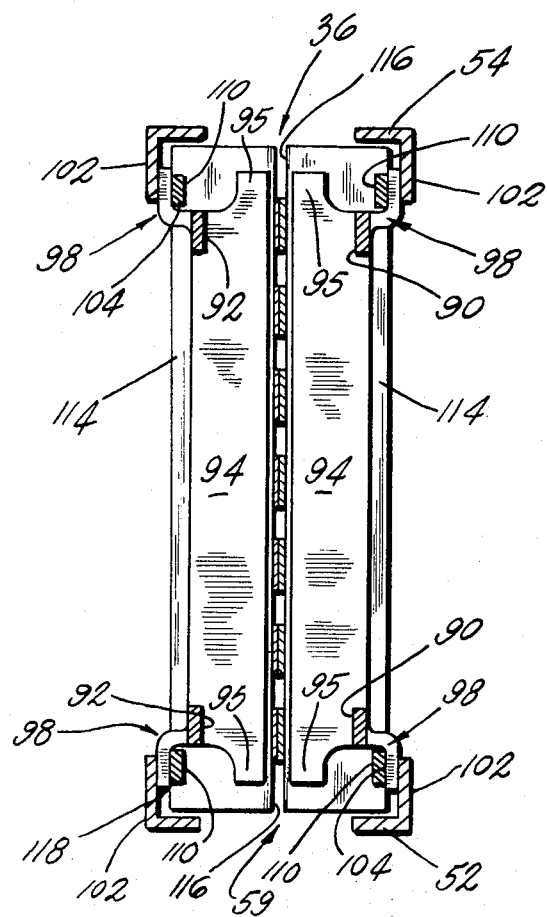
FIG. 17 is a sectional view taken along the line XVII—XVII of FIG. 7.

A reciprocating handle or gripping surface 78 is confined to move up and down with respect to the frame of the gun by means of flanges 80 extending from the end plates 52 and 52 (FIG. 6). The handle 78 has a section 82 at each end thereof which extends downwardly from the flanges 80. A shaft 84 extends between sections 82. A pair of cocking and release levers 90 and 92 are pivotally hinged to shaft 84, the levers extending downwardly toward the opening 59 in the frame. The ends of the levers 90 and 92 opposite to their attachment to the shaft 84 are formed with inwardly curved extensions 94 having outwardly projecting ears 95 (FIG. 17), which extensions are adapted to curve under the outside edges 33 of the base 32 of the tag so as to raise the tag therewith, (See FIG. 8.) The levers 90 and 92 are also provided with ears 98, the outer surfaces 100 of which are especially adapted to cam against cooperating ears 102 projecting from the end plates 52 and 54. The inner surface 104 of the ears 98 also performs a camming function as hereinafter described. (See FIG. 17.) A compression spring 106 is mounted between studs 108 projecting from the sides of the levers 90 and 92, and functions as the releasing mechanism as hereinafter described.

A pair of springing members are provided in the form of opposed levers 110 which are hinged at ends 112 (FIG. 6) to the side walls 52 and 54. The ends of the levers 110 opposite to the hinged ends 112 are formed with curved extensions 114 shaped similarly to the extensions 94 on the levers 90 and 92. The ends 116 of the extensions 114 are especially adapted to press against the tines 36 as the latter are drawn therethrough to straighten them into a plane (FIG. 8). The levers 110 have an outside surface 118 and an inside surface 120. The inside surface 104 of the ears 98 cams against the outside surface 118 of the levers during the cocking action of the gun. The inside surface 120 of the levers 110 are engaged by the ears 95 on the extensions 94 of the levers 90 and 92 when the latter levers are functioning as the releasing mechanism as hereinafter described. (See FIG. 17.)

The gun is operated by inserting tag 30 through the opening 59 (FIG. 6) in the direction of the arrow 128. At this time, the levers and springs of the gun are in the position shown in FIG. 7. The tag is inserted so that the plungers 70 ride on the top surface 35 of the base 32 with the extensions 94 of the levers being pressed against the underside of the base 32 between that underside and the barbed ends 40 of the tines 36 (FIG. 7). The handle 78 is then raised by compressing the handle towards the tripping portion 56 (FIGS. 5 and 6), the extensions 94 serving to raise the tag 30 against the action of the springs 64 (FIG. 8). The ends 116 of the extensions 114 are also underneath the tag, and force the tines 36 to be confined to a plane or straightened, the resilient reaction force of the tines being overcome by the lifting of the levers 90 and 92. The ears 102 keep the levers 110 in the position in which the ends 116 so confine the tines, this positioning of the levers 110 occurring through the camming action of the ears 98 against the exterior or outside surface 118 of the levers. Thus, the ears 102 serve to override the releasing effect of the releasing spring 106.

The cocking action terminates when the ears 98 reach the position at which they just clear the ears 102 on the frame, thus allowing the spring 106 to force the levers 90 and 92 apart (FIG. 9). The spreading of the levers 90 and 92 causes the extensions 94 to clear the edges 33 of the tag 30, the ears 95 on the extensions 94 latching onto the levers 110 so as to pull them away from the tines 36 and the base 32 of the tag, thereby allowing the tag body to clear the extensions 114 (FIG. 10). At the instant of firing by the action of the uncoiling of the spring 64, the tines 36 are sprung or bent into a sharp-edged plane (FIG. 9) so as to easily penetrate the skin of the animal 20. Immediately thereafter the spring bias or internal energy of the tines derived from their preset configuration causes the tines to curve into the skin to occupy the spring-locked position shown in FIG. 10. Thereafter, the gun 50 is simply lifted off the tag.

To ready the gun for the next tag, the levers are pushed inwardly against the action of the spring 106 and the handle 78 is lowered until the ears 98 are confined within the ears 102 of the frame. The operation is then repeated by inserting another tag and cocking and firing it by the single action of raising the handle 78 in one direction, as described above.

FIG. 11 illustrates an alternate embodiment of the gun described above, wherein a gearing mechanism provides equal displacements for the cocking levers. Parts similar to those previously described bear the same reference numeral to which the distinguishing suffix "a" has been added. Thus, the handle 78a has mounted thereon the levers 90a and 92a. However, the levers pivot from separate shafts 130 and 132 and have gearing surfaces 134 and 136, respectively. These gearing surfaces mate together so that the levers 90a and 92a are forced outwardly equal distances under the action of the spring 106.

Figure 21:
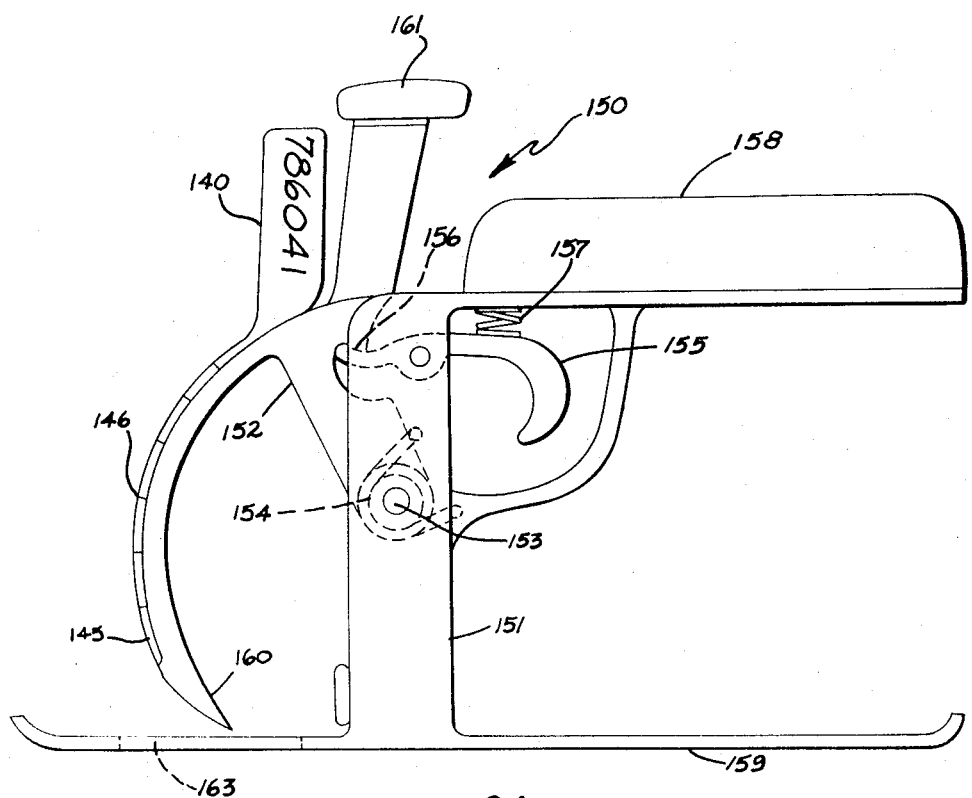
FIG. 21 is another tagging gun of the invention with a tag of FIG. 18 in cocked position.

Another tagging gun of the present invention is illustrated in FIGS. 21-25, which is useful for implanting tag 140 into the skin of an animal. As shown in FIG. 21, tagging gun 150 comprises a base 151 and an implanting arm 152 pivotally mounted on base 151 on mounting pin 153. Spring means 154 provides a rotating force to rotate blade 160 of implanting arm 152 through openings 163 in foot 159 of base 151 to implant tag 140, which is mounted on blade 160, into the skin of an animal. Trigger 155, pivotally mounted on base 151, engages implanting arm 152 at recess 156 to lock it in cocked position against the rotating force of spring means 154. Spring means 157 biases trigger 155 into the locking position.

Figure 22:
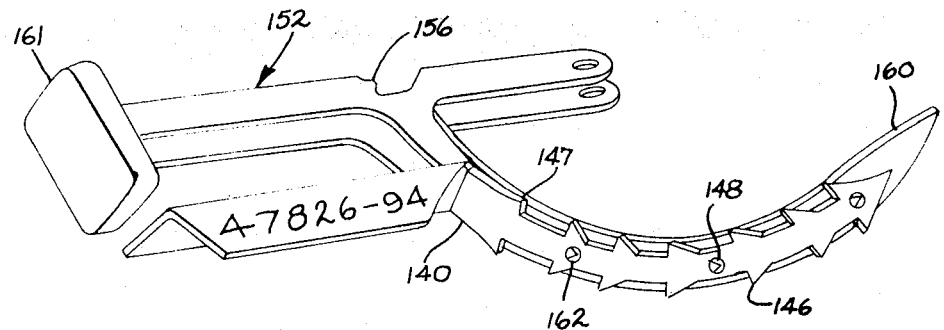
FIG. 22 is a top perspective view of the implanting arm of the tagging gun of FIG. 21 with a tag of FIG. 18 in implanting position.
Figure 23:
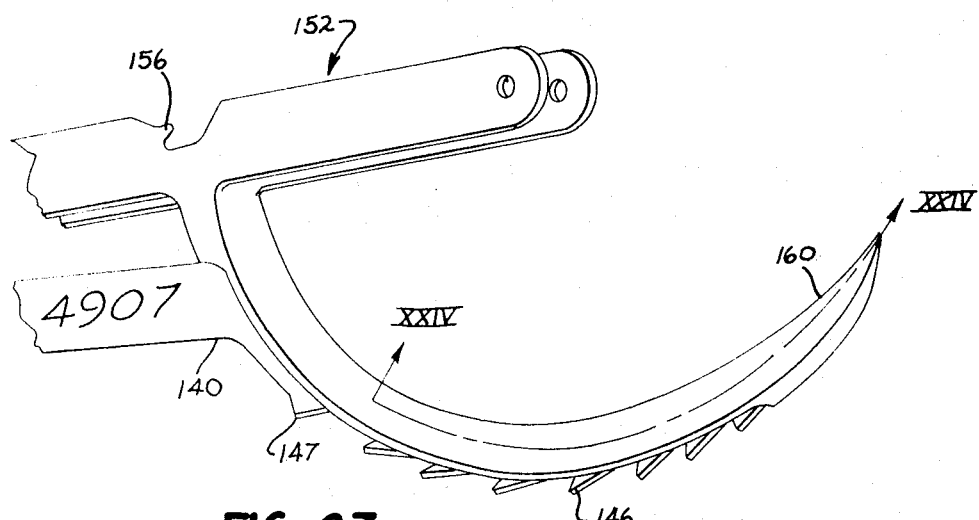
FIG. 23 is a fragmentary bottom perspective view of the implanting arm of FIG. 22.
Figure 24:
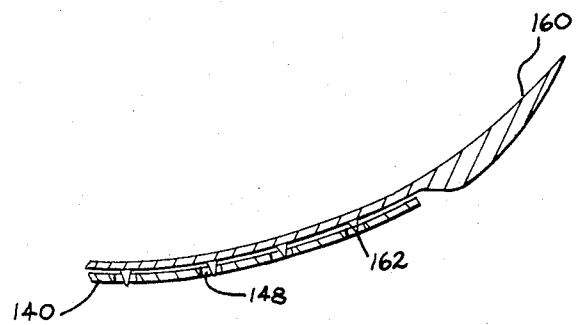
FIG. 24 is a cross-sectional view of the implanting arm of FIG. 23 taken along the line XXIV — XXIV of FIG. 23.

FIGS. 22-24 illustrate implanting arm 152 and the mounting of tag 140 on blade 160 in greater detail. Tag 140 is mounted on blade 160 by placing it on the blade with pins 162 of blade 160 being inserted in apertures 148 of tag 140. Pins 162 act to cause tag 140 to follow blade 160 during implanting. Pins 162 are slanted or cammed on the side opposite the direction of implanting so that when the blade is withdrawn from the skin of the animal, they slide out of aperture 148 and, thus, tag 140 remains implanted.

During implanting, the operator uses tagging gun 150 in a manner similar to that used for tagging gun 50 shown in FIG. 5. The gun is gripped by handle 158 and held in position on the back of the animal with foot 159 firmly against the skin, with the implanting arm cocked and loaded with a tag. Trigger 155 is pulled and implanting arm 152 is released and rotates blade 160 through opening 163 in foot 159 inserting blade 160 together with implanting stem 145 of tag 140 into the skin of the animal 20. Depending on the curvature of blade 160 and the curvature of the tag stem 146, 146', the end of implanting stem 145 will either protrude through the skin of the animal such as illustrated in FIG. 26 or will remain beneath the skin such as illustrated in FIG. 27. Handle 161 is then used to withdraw blade 160 and recock the gun for the next implanting. During the implanting stroke, flexible barbs 146 on implanting stem 145 flex inward, facilitating easy insertion. However, on withdrawal of blade 160, barbs 146 flex outward to secure the tag in its implanted position.

Figure 25:
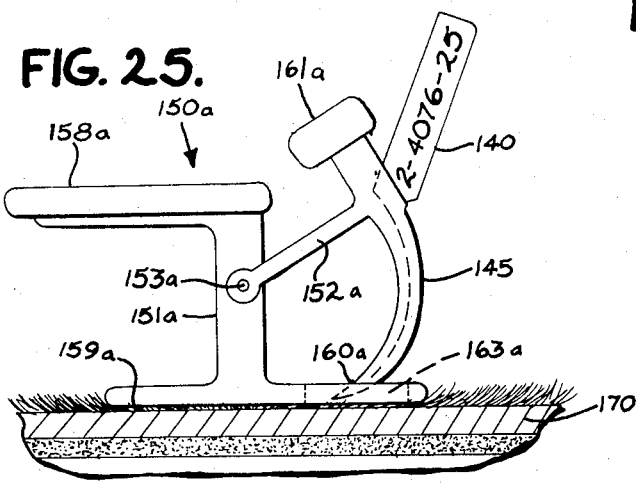
FIG. 25 is a side elevational view of a variation of the tagging gun of FIG. 21 in implanting position on the back of an animal.

FIG. 25 illustrates tagging gun 150a which is a manual version of tagging gun 150, with like parts being indicated with like numerals followed by the suffix "a." In this version, implanting is accomplished by rotating implanting arm 152a manually by handle 161a.

Information Retrieval Station

Referring now to FIGS. 12 through 16, in accordance with yet another aspect of the invention, an information retrieval station 200 is provided which comprises a chute which may or may not be horizontal, the chute being defined by side walls 202 and a floor 209. As confining means, contractible squeeze pads 206 are mounted for sideways reciprocation with respect to the walls 202, so as to confine the animal 20 to move through the center of the chute as opposed to the sides. A weighing platform 208 is positioned in the floor 209 of the chute between the pads 206. A conventional photoelectric sensing device 210 is mounted across the path of the chute. The two parts thereof are positioned on both of the pads 206 at a point which will detect the movement of the animal 20 through the chute, preferably when the animal is fully supported by the platform 208.

A tag reading machine 220 (FIGS. 12 and 13) is mounted from a support such as a ceiling 222. The machine 220 comprises a magnetic read head 224 supported by rods 226 pivotally hung from a mounting portion 228 of the machine. The portion 228 contains a driving motor for rotating the shafts mounting the rods 226 thereto, the motor being actuated when the photoelectric sensing device 210 is triggered by the passage of the animal 20 therebetween. Outrigger arms 230 are mounted on the magnetic reading head 224 and contain at their ends on both sides of the confinement area within the chute a second photoelectric sensing device 234 (FIG. 13). The sensing device 234 senses the lowering of the reading device 220 to the vicinity of the animal's back. The lowering of the reading head 224 stops at this point, the reading head thus being sufficiently located with respect to the tag. The head 224 then is actuated to read the information stored on the strip 44 of the tag 30. Such reading may occur as the animal moves through the stall, may be stationary or the head may be moved with respect to the tag depending upon the particular components utilized. Thereafter, the portion 228 raises the reading head 224.

After being processed, the animal continues to move out of the station in the direction of arrow 238, and the process is repeated for the next animal. It will be appreciated that different animals have different back heights, and accordingly the rods 226 are constructed long enough to position the read head at all of the heights for the animals involved.

FIGS. 14 and 15 illustrate an alternate embodiment for the information retrieval station, wherein the magnetic reading head is differently constructed. Parts similar to those previously described bear the same reference numeral to which the distinguishing suffix "a" has been added. Thus, the station 200a features the squeeze pads 206a which confine the animal to the center of the chute as previously described. A weighing platform 208a is located between the pads. The reader 220a is supported from the ceiling 222a by only a single pair of rods 226a. The mounting portion 228a for the rods 226a incorporates a motor to drive the shaft mounting the rod 226a as in the previous embodiment. The actual reading head for the reader 220a, in contrast with the previously described embodiment, features a roller 240 (FIG. 16) adapted to roll across in contact with the tag 30. The reading surface of the roller 240 is necked-down portion 242 spaced from the ends 244 of the roller 240. In this embodiment, when the photoelectric sensing device 210a detects the movement of the animal through the chute, it causes the motor in portion 228a to rotate the levers 226a downwardly. The roller 240 is then caused to ride along the back of the animal and up over and around the tag 30 as the animal walks through the station 200a, inasmuch as the rods 226a continue to press the roller downwardly against the back of the animal. The conical portions 246 between the reading portion 242 and the ends 244 cause the roller 240 to center upon the tag, thereby assuring that the portion 242 locates and contacts the entire strip 44 to obtain accurate reading of the information coded in that strip.

The electronic components of the magnetic reading heads 224 and 240 can be of any type, such as are found in conventional magnetic reader or pick-up units.

Figure 28:
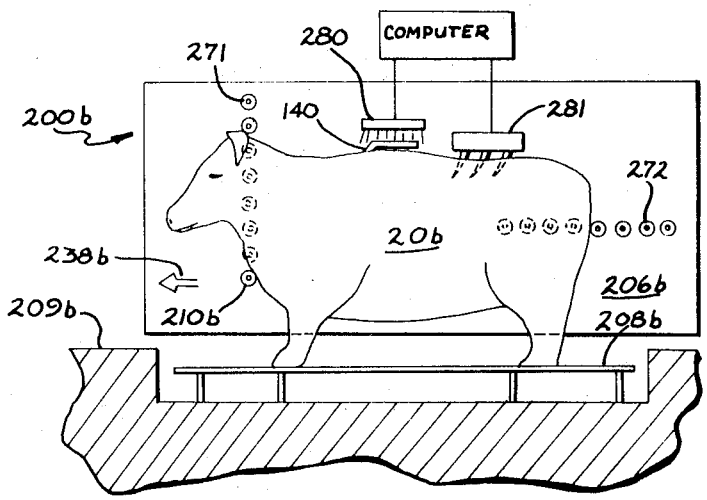
FIG. 28 is a fragmentary side elevational partially schematic view of another alternate embodiment of the recording station of the invention.

Yet another embodiment of the recording station is illustrated in FIG. 28, which is similar to the recording station of FIGS. 12 and 13 and in which similar parts bear the same reference numeral with the suffix "b" added and function the same as hereinbefore described. A feature of this embodiment is the presence of a series of photoelectric devices 271 and 272 for measuring the height and length, respectively, of the animal 20b. These photoelectric devices can also operate to automatically vertically position the machine reading means at a proper distance from the tag for proper reading. Furthermore, the magnetic machine 220 of FIGS. 12 and 13 has been replaced with an optical scanner 280 to read the information which is optically coded on tag 140.

Record Keeping Process

All of the preceding apparatus and structure allows for the first time individual records to be kept automatically on each individual animal. For example, this is accomplished by tagging the animal at a suitable stage in its development with a tag such as tag 30 which can be implanted by means of the gun 50 as described above. The tag can be initially formed with an identification number coded into the strip 44 and visually printed on the side 42 thereof. The initial weight or other growth characteristic of the animal can then be determined by passing it through the information retrieval station 200, wherein the identity of the animal is determined by the magnetic reader head 220 or 220a. The identity information is then automatically conveyed to a computer 260 along with the other information measured, e.g., the weight information detected by the platform 208. Or, the indentity information can be obtained visually by reading the tag 30 and entering it by means of a teletype link 262 into the computer. (See FIG. 16.) Thereafter, the animal is fed for the desired length of time, and its progress determined by passing the animal through the information retrieval station again. At this time its identity is machine read again from the coded information on the tag and the new weight, etc. is determined. The code reading by the magnetic head can be accomplished simultaneously with the weight determination, etc. due to the construction of the station 200.

The use of the magnetic readers 220 can be combined with a writing head, if desired, to cause additional information to be coded into the magnetic strip 44. This might be desirable, for example, when the animals were being given vaccinations or special types of feeds, and some simple means was necessary to determine which animals had been so treated.

Yet another feature of the magnetic readers 220 and 220a is that they automatically ascertain the height of the animal. Thus, a sensing mechanism can be incorporated into the portion 228 or 228a to automatically detect the amount of rotation experienced by the arms 226 or 226a before they stop their downward rotation. The sensing mechanism can be calibrated to convert the rotation into a height value, which value is then automatically conveyed to the computer 260 along with the other data as explained above.

It will be readily apparent that the use of the automatic read-out of the identity information allows the computer to automatically store the information and update the records of the individual animal involved. This automatic read-out further allows the computer to direct automatic gating means to further control the processing of the animal in accordance with its performance as determined by its weight or other growth characteristic. For example, where it is desired to cull out animals which are not gaining weight fast enough, the computer can compare the performance record of each individual animal with the desired standard and direct the individual animals to different localities by activating gating means (not shown) or if it is desired to cull out animals based on their meat characteristics, e.g., fat profile or to record such information, an appropriate sensing device (281 in FIG. 28) can be included in the recording station which activates gating means or is connected to a computer to be correlated with the identification reading. All of this can be accomplished by the disclosed structure without the need for human operators to identify the animals.

Although the invention has been described in connection with certain preferred embodiments, it will be apparent that equivalent embodiments can be conceived and constructed. For example, the entire system is not limited to tagging animals but can be utilized, in certain situations, to tag inanimate articles as well. Also, the machine readable feature of the tag and of the information retrieval station is not limited to the use of magnetic fields, optical scanners, or the other systems exemplified herein. Thus, it is intended that the invention include equivalent embodiments, unless the following claims by their express wording state otherwise.

The embodiments of the invention in which an exclusive property or privilege is claimed are defined as follows.

1. An information retrieval station for automatically identifying and collecting data on tagged animals, each of said animals having a tag secured thereto, each of said tags including coded information peculiar to the respective animal on which the tag is secured; said station comprising means for confining and directing each of said tagged animals to a prescribed area and direction of travel; means for automatically sensing the presence of one of the animals; means for locating the tags fixed to the animals, and means operating in conjunction with said locating means and said sensing means for machine reading the tags without removing said tags from said animals whereby each individual tagged animal is identified from the coded information on said tag secured thereto while said tags remain secured on each of said animals.

2. The station as defined in claim 1, wherein said locating means includes a photoelectric unit the sensing portions of which are mounted on both sides of said area, said unit operating in response to said sensing means.

3. The station as defined in claim 1, wherein said reading means includes a magnetic read head for detecting codes magnetically carried by the tags.

4. The station as defined in claim 3, wherein the tags are mounted on the back of the animal, and said locating means includes a roller adapted to roll across the animal's back, said head including a surface on said roller which contacts the area of the tag carrying said magnetic code.

5. The station as defined in claim 4, wherein said roller is mounted for raising and lowering with respect to the animal backs, said roller being lowered in response to said sensing means.

6. The station as defined in claim 4, wherein said surface includes a necked-down portion on said roller spaced from the ends of the roller, the portions between said necked-down portion and said ends being shaped so as to constantly center said surface on the tag as said roller rolls across the animal's back.

7. The station as defined in claim 1, and further including a weighing platform positioned with said area.

8. The station as defined in claim 7, wherein said confining and directing means includes a chute with contractible sides, said platform and said sensing means being cooperatively positioned within said chute so as to detect the presence of the animal only when it is fully supported by said platform.

9. The station as defined in claim 1, and further including means for automatically sensing the height of the animal.

10. An information retrieval station for automatically identifying and collecting data on animals bearing tags located in a standard position; said station comprising means for confining and directing each of said animals to a prescribed area and direction of travel; means for automatically sensing the presence of each of said animals; means for machine reading the tags while said tags are secured on said animals and without removing said tags from said standard position on said animals; and means for measuring the physical characteristics of each of said animals, said reading means and said measuring means operating in conjunction with said sensing means, said reading means reading said tags only after said sensing means had indicated the presence of an animal.

11. The station as defined in claim 10, wherein said measuring means includes a weighing platform positioned within said area.

12. The station as defined in claim 10, wherein said measuring means includes means for automatically sensing the height of the animal.

13. The station as defined in claim 10, and further including means for automatically vertically positioning said reading means at the proper distance from the tag for reading by said reading means.

14. The station as defined in claim 10, wherein said confining and directing means includes a chute, the sides of which are adjustable, and means for adjusting said sides so as to properly locate the animal to be read with respect to said reading means.

15. The station as defined in claim 10 wherein said measuring means includes means for automatically sensing the length of the animal.

16. The station as defined in claim 10 wherein said tags are optically coded and said means for machine reading the tags comprises an optical scanner.

* * * * *